J. V. MARTIN.
AIRCRAFT STRUCTURE.
APPLICATION FILED NOV. 14, 1918.
1,418,008.
Patented May 30, 1922.
9 SHEETS—SHEET 7.
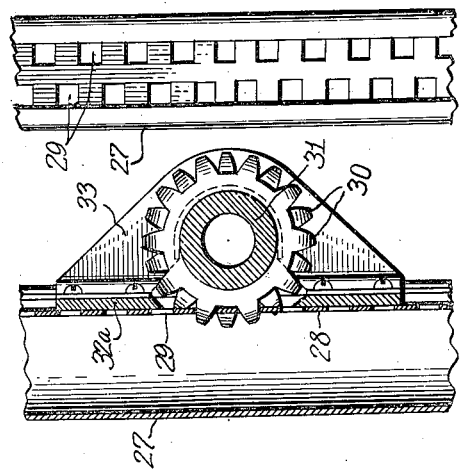
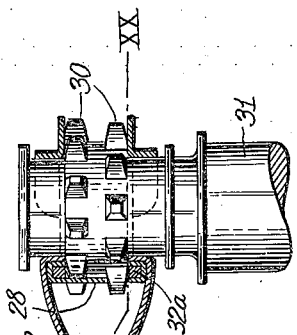
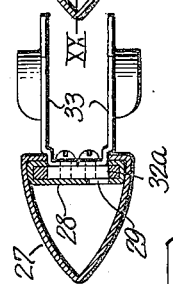
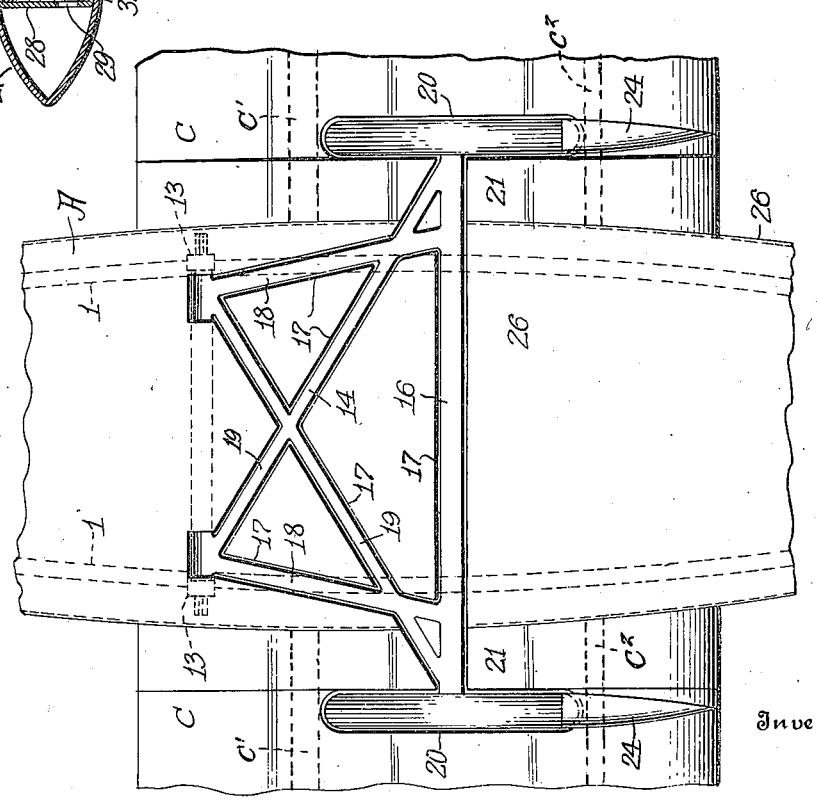
Witness
Chas. W. Stauffiger
Anna M. Dorr
Inventor
James V. Martin,
By
[signature]
Attorneys

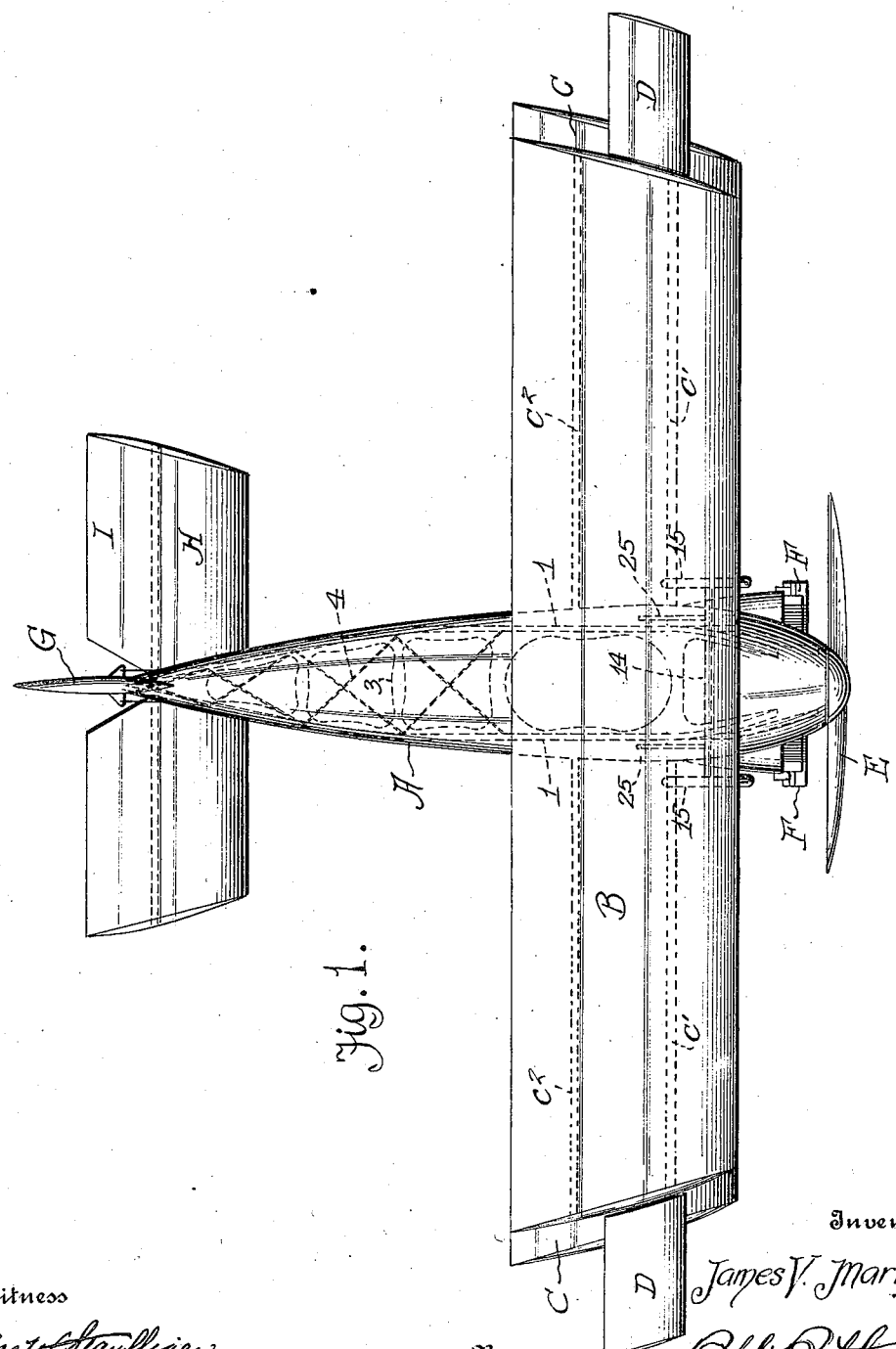

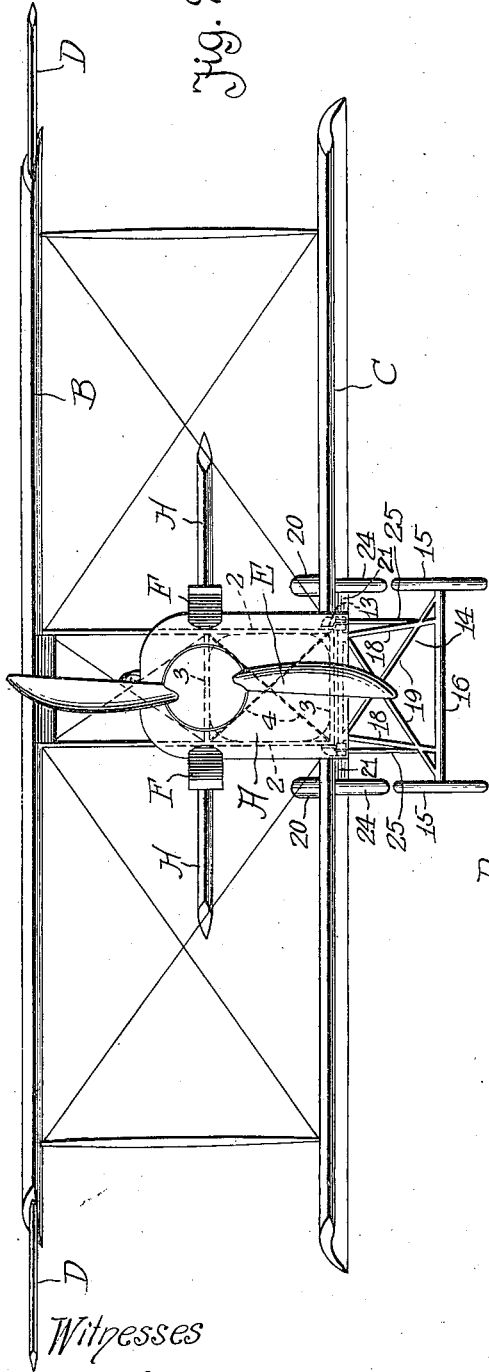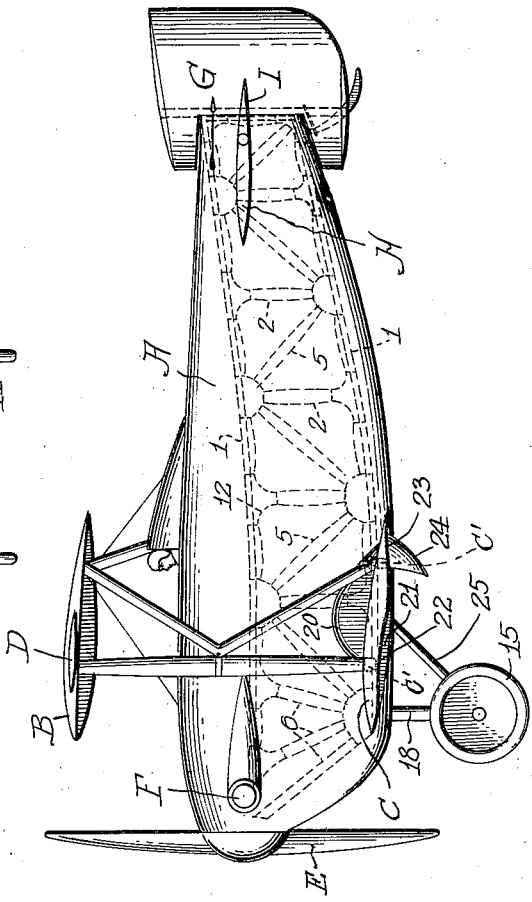

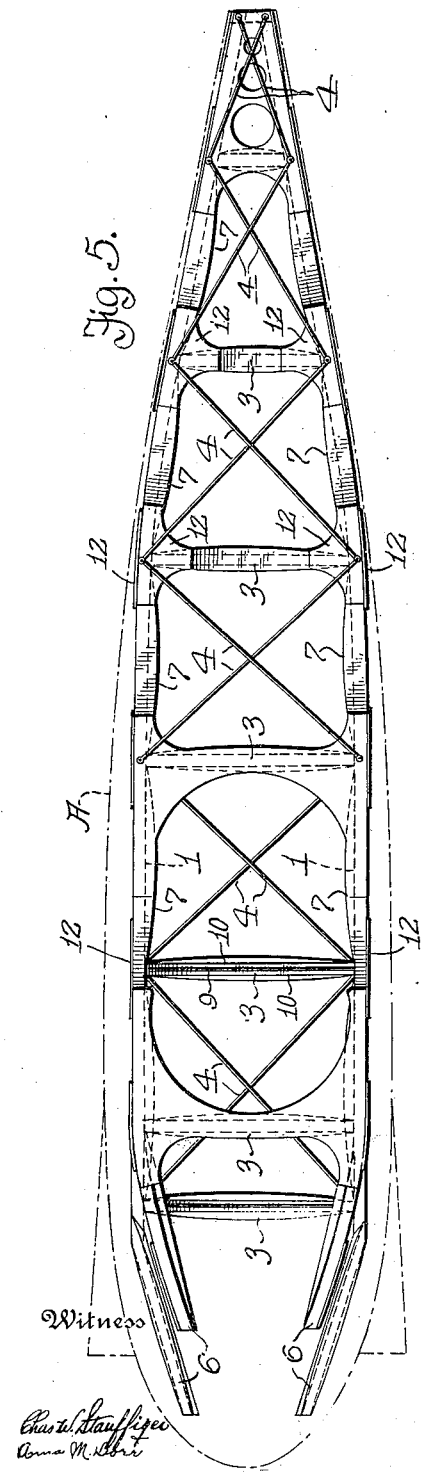
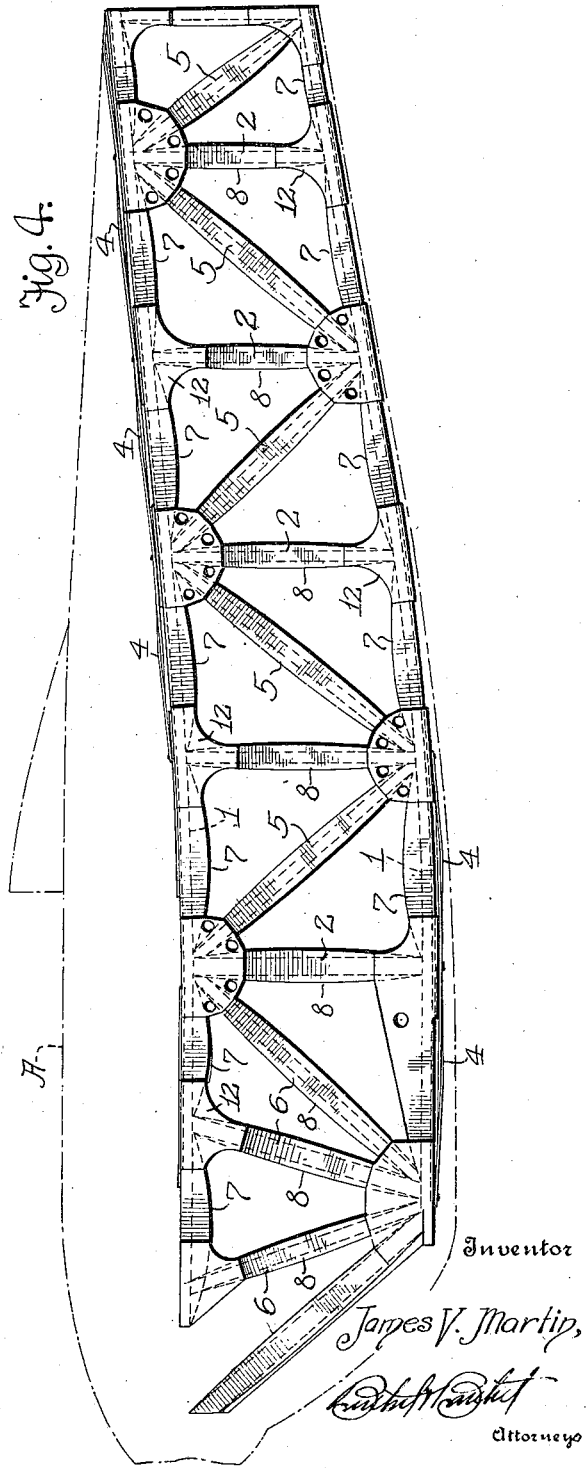

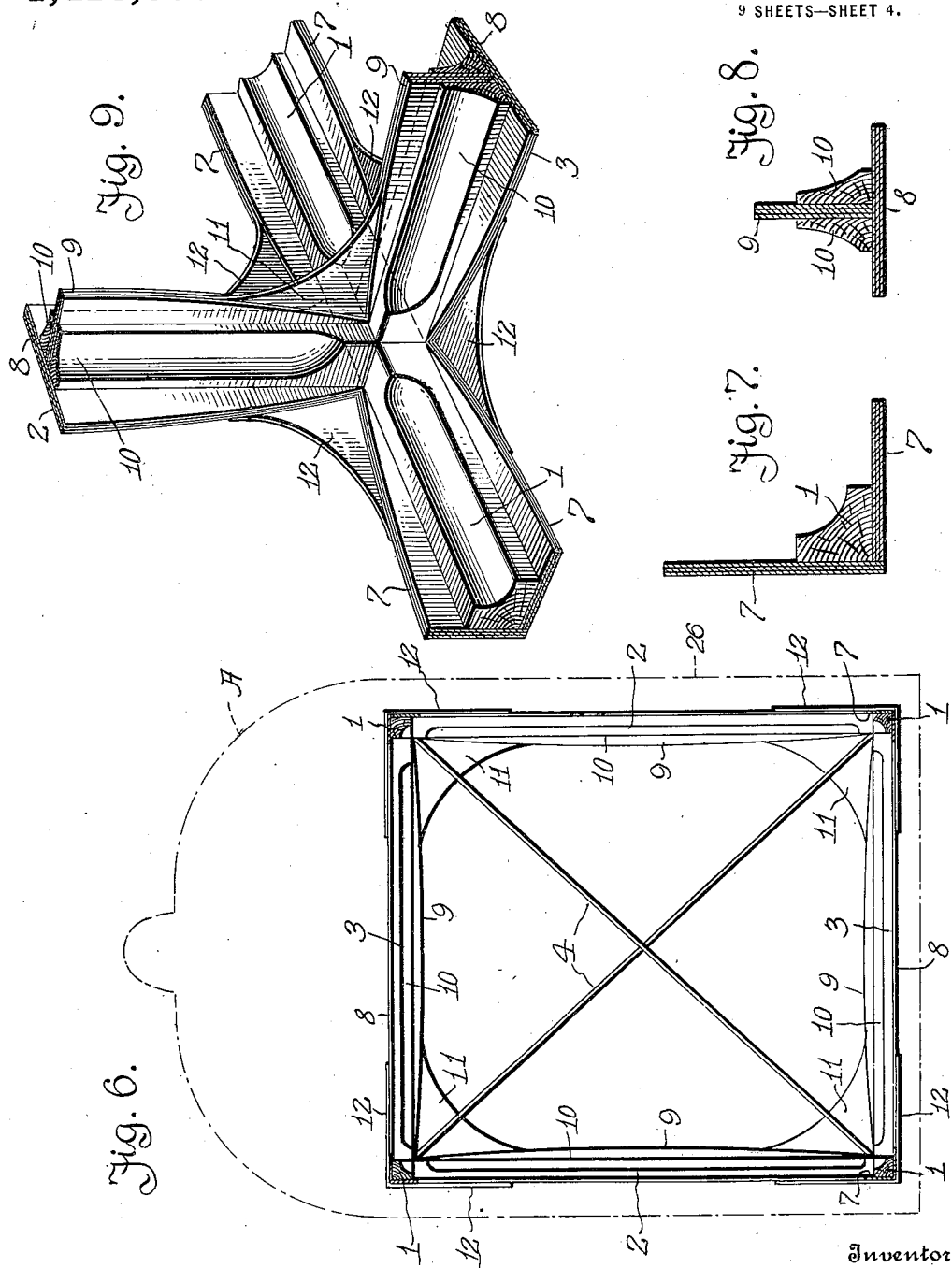

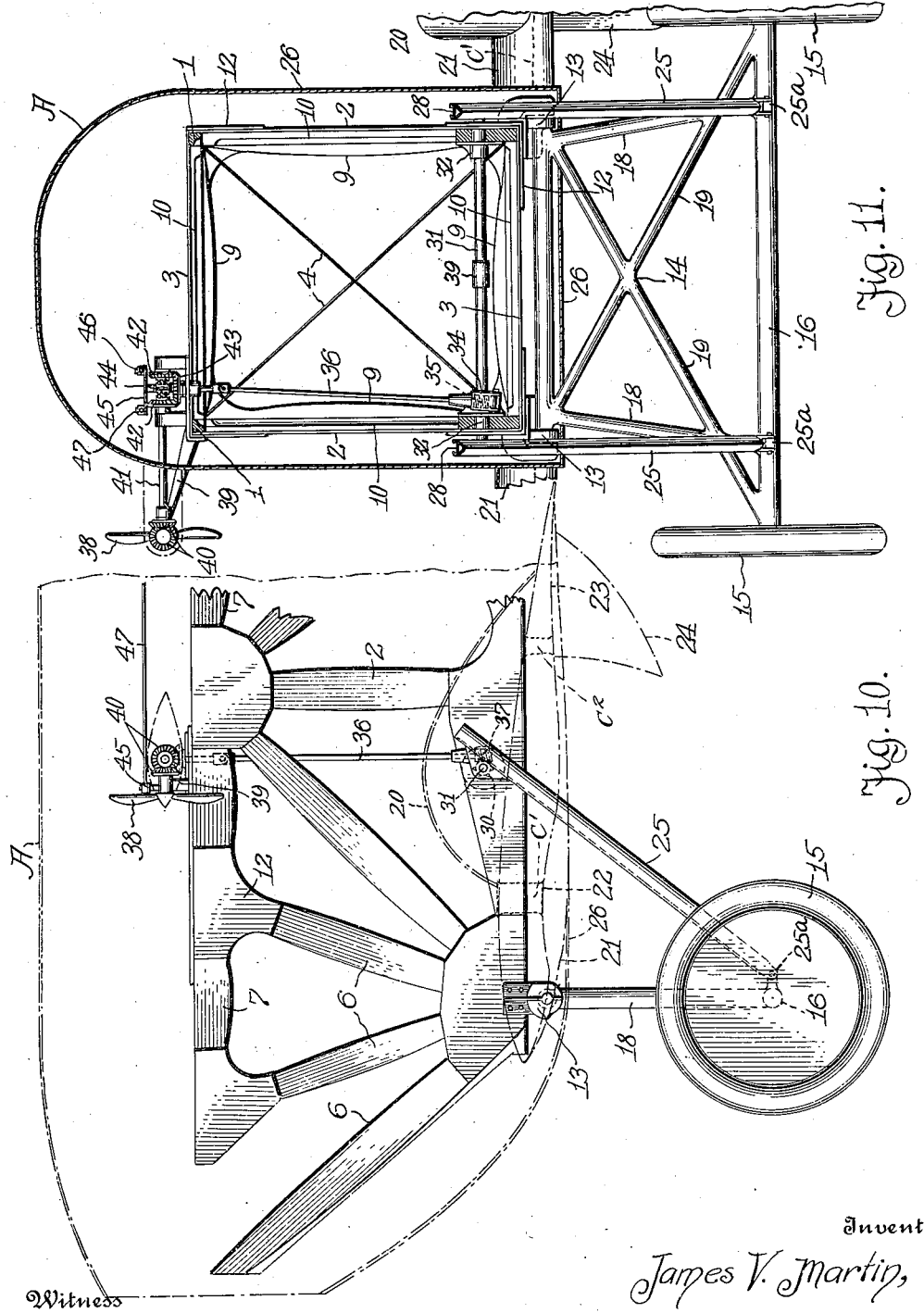

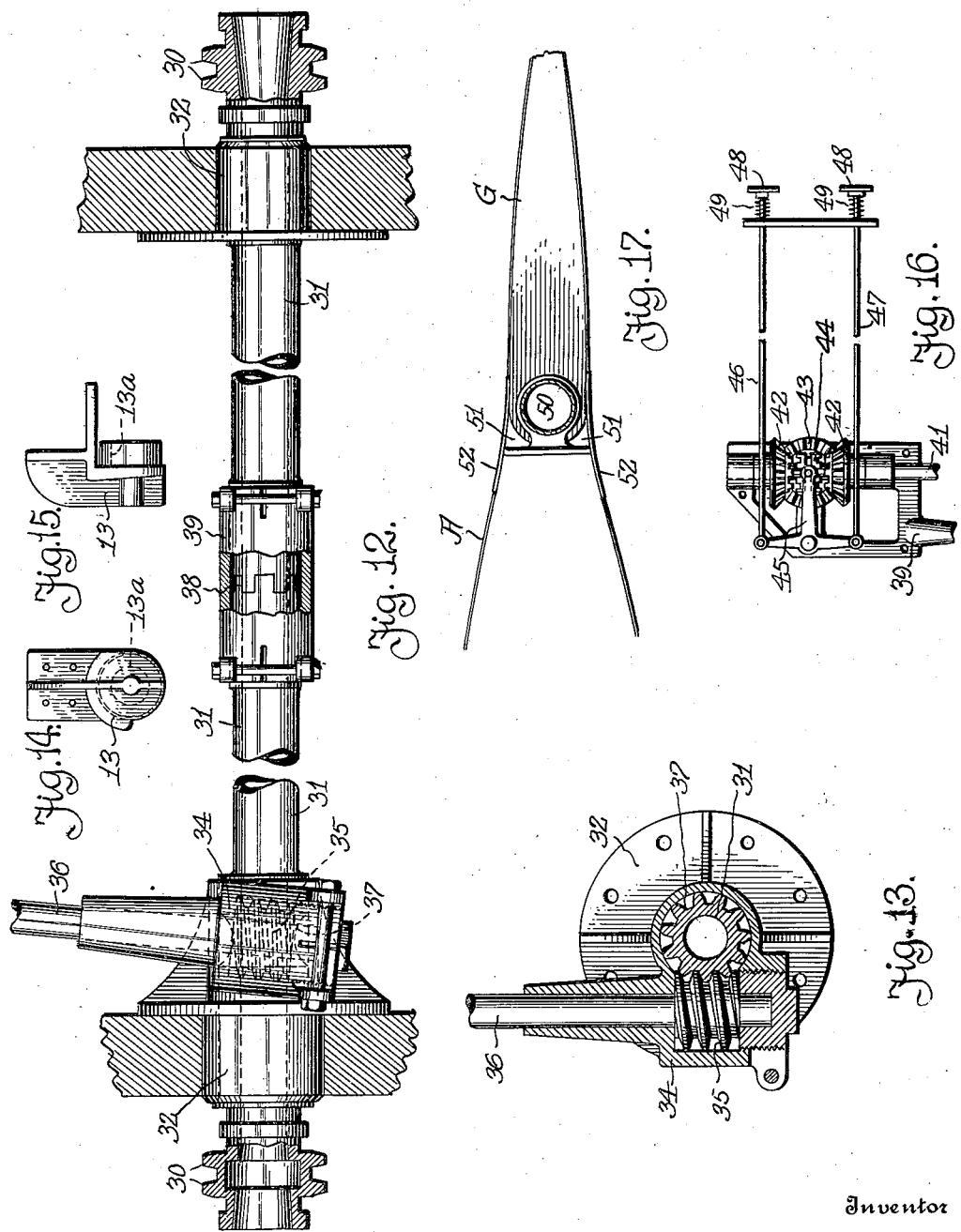

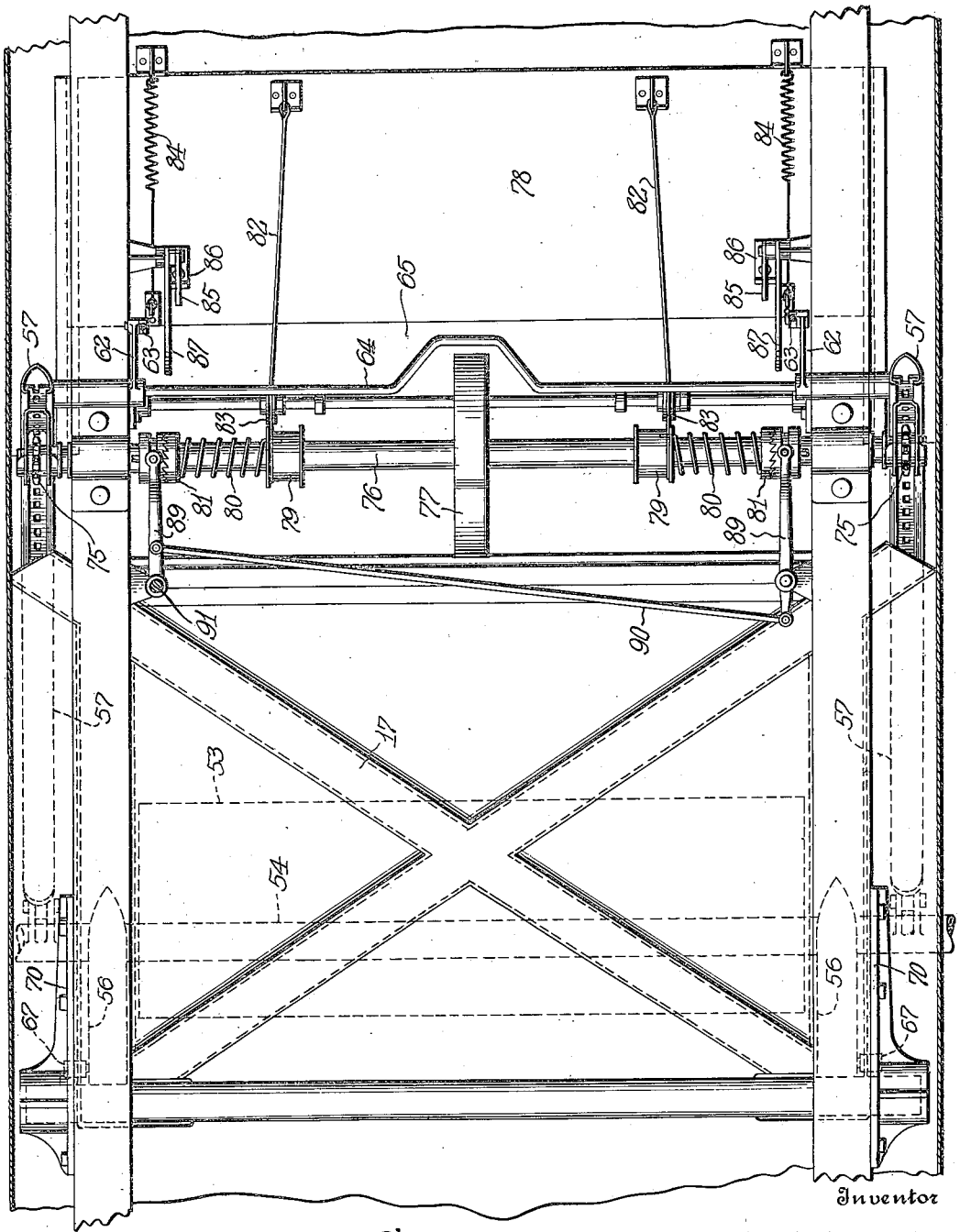

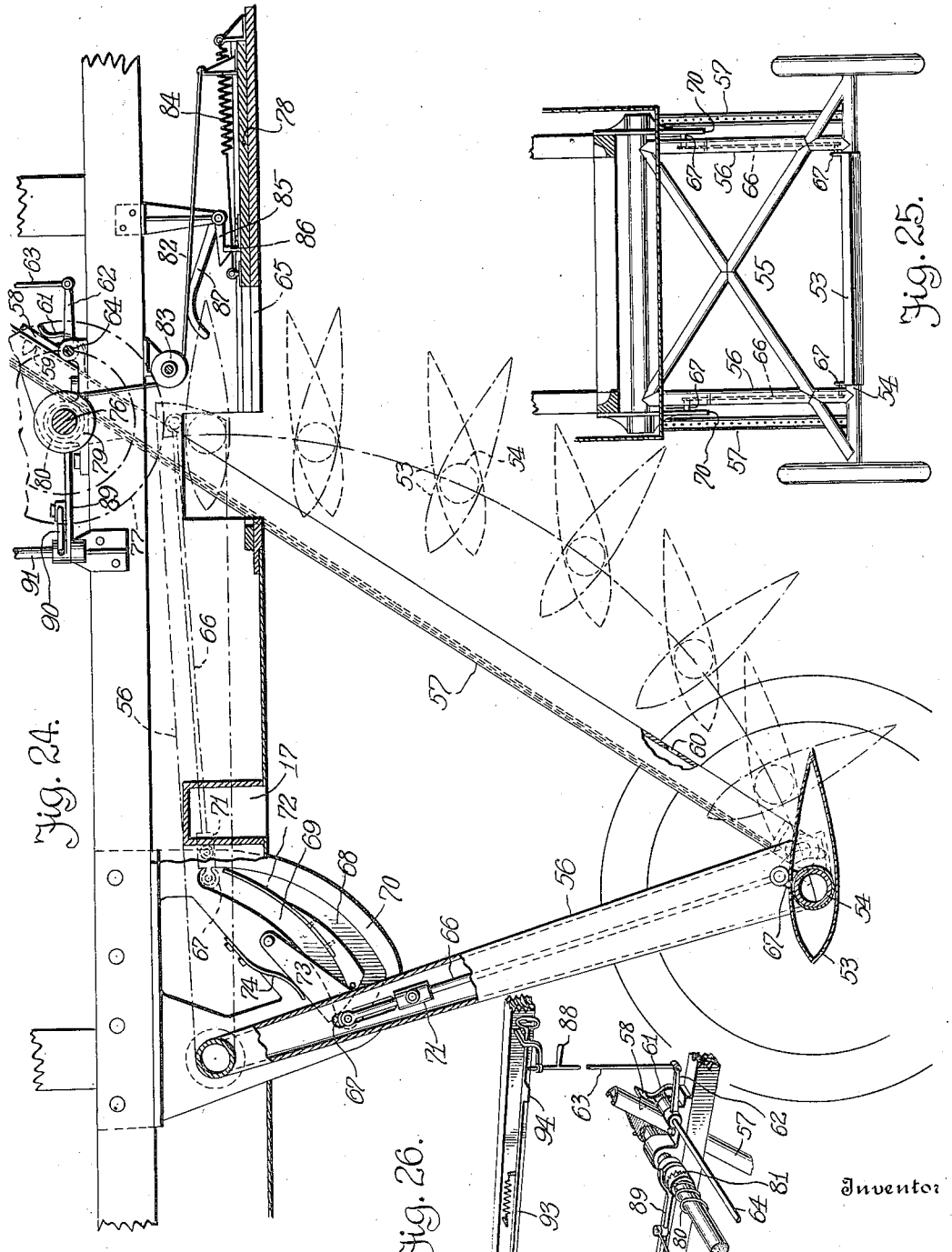

UNITED STATES PATENT OFFICE.

JAMES V. MARTIN, OF ELYRIA, OHIO.

AIRCRAFT STRUCTURE.

1,418,008.  Specification of Letters Patent.  Patented May 30, 1922.

Application filed November 14, 1918. Serial No. 262,477.

*To all whom it may concern:*

Be it known that I, JAMES V. MARTIN, a citizen of the United States of America, residing at Elyria, in the county of Lorain, State of Ohio, have invented certain new and useful Improvements in Aircraft Structures, of which the following is a specification, reference being had therein to the accompanying drawings.

This invention relates to certain new and useful features in the construction of aeroplanes and one of the objects thereof is to provide a construction of chassis and fuselage whereby the chassis frame may be housed partially in the fuselage and partly in the wing structures, thereby permitting the use of a narrow fuselage and a chassis having a wide tread. A further object is to provide means for raising or lowering the chassis, which means is constructed to hold the chassis in any position to which it is adjusted, thereby permitting the chassis to function as an alighting device in any projected position, and, also to provide means for automatically projecting or retracting the chassis, said means being arranged to employ, broadly, the action of air currents set up by the aeroplane in flight, as a motive power for operating the chassis. A further object is to reduce head resistance to the minimum by streamline wheel housings and other parts, and providing a flush closure for the chassis housing together with means for automatically operating said closure to open or close the same. It is also an object of the invention to provide a very light, strong and rigid fuselage framing and bracing construction, and to provide certain other new and useful features in the construction, arrangement and combination of parts, all as hereinafter more fully described.

With these and other ends in view, the invention consists in the matters hereinafter set forth and more particularly pointed out in the appended claims, reference being had to the accompanying drawings in which—

Fig. 1 is a plan view of an aeroplane embodying features of the invention;

Fig. 2, a front end elevation of the same;

Fig. 3, a side elevation of the same;

Fig. 4, is a detail view showing a side elevation of the fuselage or body framing;

Fig. 5, a plan view of the same;

Fig. 6, an enlarged transverse section of the same;

Figs. 7 and 8 are sectional details of the framing;

Fig. 9 is a perspective detail of a portion of the framing;

Fig. 10 is a sectional detail showing the forward part of the fuselage with a foldable chassis attached and mechanism for operating the chassis;

Fig. 11 is a transverse section through Fig. 10, showing the chassis and its operating mechanism in elevation;

Fig. 12 is a sectional detail of power transmitting means for raising and lowering the chassis;

Fig. 13 is a sectional detail of a worm drive forming a part of the power transmitting means;

Figs. 14 and 15 are side and end elevations respectively of a pivot bracket for attaching the chassis to the fuselage;

Fig. 16 is a detail view of means for controlling the power transmitting means;

Fig. 17 is a diagrammatic view illustrating a flexible skin covering for a joint between a rudder or other plane and the part to which it is pivotally attached;

Fig. 18 is a sectional detail of a rack and guide yoke with a shaft and its pinion in elevation;

Fig. 19 is a similar view with the yoke in elevation and shaft and pinion removed;

Fig. 20 is a sectional view substantially upon the line XX of Fig. 18;

Fig. 21 is a face view of a portion of the rack;

Fig. 22 is an inverted plan view of a portion of the fuselage and lower wings, showing the chassis in retracted position;

Fig. 23 is an enlarged view of a portion of the bottom of the fuselage showing an opening therein to receive portions of the chassis, and a closure for the opening with automatic means for operating the closure.

Fig. 24 is a detail view illustrating a modification in the means for raising or retracting the chassis and also showing the closure for the opening in the fuselage and mechanism for operating the closure;

Fig. 25 is a front end elevation of Fig. 24, drawn to a reduced scale; and

Fig. 26 is a perspective view of controlling means for releasing holding dogs for chassis elevating racks and for controlling the automatic opening and closing of the closure.

In Figs. 1, 2 and 3 of the drawings a particular type of aeroplane is shown but it will be understood that the several inventions may be embodied in other types of aeroplanes, the one shown being merely illustrative of the application of new and useful features to an aeroplane construction.

In Figs. 1, 2 and 3 A indicates the fuselage or body, B the upper main sustaining plane or wing, and C the lower wings.

The plane B is provided at its ends with the usual ailerons D and at the forward end of the fuselage is the propeller E driven by a suitable motor F located at the forward end of the fuselage and mainly inclosed therein. At the rear end of the fuselage is the usual rudder G, and stability planes H having the usual rearwardly extending altitude planes I.

Figs. 4 to 9 inclusive illustrate the construction of the fuselage framing which consists of four longérons 1 spaced by suitable vertical struts 2 and horizontal top and bottom connecting bars 3, together forming in cross section a rectangular structure which is tied together transversely by diagonal brace rods 4.

Diagonal tension and compression members 5 are interposed between the end of the struts 2, extending diagonally across the space between adjacent struts, and at the forward end of the frame, to provide a strong and rigid engine support, members 6 of a construction similar to the members 5 are secured at their upper ends in spaced relation along the upper longérons and converge downwardly to a substantially common connection with the lower longérons.

To provide a very light, strong and rigid fuselage framing, the longérons 1 are reinforced between the struts 2 by a plurality of sheets of veneering glued together and laid upon the outer faces of the longérons, these built-up reinforcing strips 7 being curved at their free edges to provide greatest width intermediate their ends between the struts, these reinforcements thus lending maximum strength to the longérons with a minimum addition of weight. The several struts 2 and cross members 3 are made up of an outer facing 8 comprising layers of veneer glued together and formed with edges which are curved to give greatest width to the facing intermediate its ends, the facing being narrowed toward the juncture of the member with its longérons.

Secured to the inner side of the facing 8 and extending inwardly of the frame work at right angles to the facing, is a center member or rib 9 formed of plies of veneering and this strip is also curved at its free edge toward its ends to provide its greatest width midway between the longérons. The angles between the facing and strip or web 9 are partly filled by corner strips 10 and thus these members are T-shaped in cross section with their flanges formed of veneering and the meeting angles filled in by corner strips to more securely unite the web 9 to the outer strip or facing 8. These struts and bars thus have great strength, because of this particular construction to withstand very heavy tension and compression strains and stresses with the least possible weight of material.

To securely unite and brace these struts and bars at their points of meeting with the longérons, angle webs 11 are provided by continuing one or more of the layers of veneering of the inner web 9 into and between layers of the corresponding web in the adjacent strut or bar, as shown in Fig. 9, thus firmly uniting a strut and bar by a web of veneering extending across their meeting angle which web is properly curved to give the desired appearance and take up less space within the frame.

The ends of the bars and struts where they meet the longérons may be secured thereto in any suitable manner and this joint is reinforced by means of angle plates 12 of veneer or other suitable material and suitably formed to extend across the meeting angles of the struts and bars with the longérons. These plates are glued or otherwise secured to the outer faces of the framing members, and thus the struts and bars are securely attached to the longérons and the meeting angles reinforced and braced to give the maximum strength with a minimum of weight to the entire framing structure.

Secured to the forward end of the fuselage near the forward ends of the lower longérons and adjacent the point of convergence of the struts 6, are two journal brackets 13 shown in detail in Figs. 14 and 15, for the pivotal attachment of the chassis frame 14 to the fuselage. This frame comprises an upper transverse member having projecting ends or studs to engage the bearings of the brackets 13 which brackets are each formed with an enlarged bore 13ª to provide enlarged bearing surfaces for the studs of the frame, thus giving a very strong and rigid pivotal attachment of the frame to the fuselage. As these brackets are attached to the fuselage substantially at the point of convergence of the struts 6, the shock and strain of alighting comes upon the fuselage at its strongest point and where the greatest weight is carried, the several radiating struts being arranged to take the heavy compression strains to which they are subjected when the aeroplane comes to earth and the wheels 15 which are mounted upon the ends of the axle 16 formed integral with the lower part of and forming the lower cross member of the frame 14, strike the ground in alighting.

The pivotal attachment of the chassis frame 14 to the fuselage permits of its retraction or upward folding in flight, but as the chassis axle must be of greater length than the width of the fuselage in order to provide the necessary width of tread to properly support the extended wing spread in alighting and to obviate making the fuselage so wide as to be impractical, the lower wings are constructed to permit such folding of the chassis, the wing spars indicated in dotted lines at $C'$ and $C^2$ in Figs. 1, 3, 10, 11 and 22, being so positioned and spaced as to permit the wheels of the chassis to be brought or swung upwardly between them, said spars being firmly secured at their inner ends to the fuselage and continued outwardly along the wings directly beneath the lower ends of the K bars which are attached thereto, thus providing a very rigid wing structure, the strength of which is unimpaired by the housing of the chassis therein in the manner hereinafter described. The bottom skin of the fuselage is formed with grooves or recesses 17 (Figs. 22, 23 and 24) to receive the legs 18 and diagonal brace members 19 of the frame 14 when the frame is swung upon its pivot rearwardly and upwardly toward the lower side of the fuselage, these frame members being preferably stream lined and the grooves 17 formed of such cross sectional dimensions as to contain the frame members, which, when positioned therein, close these slots or grooves by reason of the front face of the members lying substantially flush with the outer surface of the fuselage skin. The axle 16 is of greater length than the width of the frame 14 so that its end portions upon which the wheels 15 are mounted extend beyond the vertical plane of the sides of the fuselage, thus giving the landing chassis a comparatively wide base and permitting of a comparatively narrow fuselage. The projecting ends of the axle are strengthened by continuing the diagonal brace members 19 beyond the sides of the frame to a point of meeting with the axle adjacent to the wheels and these wheels are partially housed when the chassis is in folded position by providing a housing 20 therefor upon each lower wing C, which housing is preferably stream lined to reduce head resistance. The wheels are thus moved by the folding of the chassis, from a point forwardly of the center of gravity of the aeroplane, rearwardly to position within the housings. The portion 21 of each wing between the housing 20 and the fuselage, is formed to enclose the bearing brackets 13 and is also formed with a suitable recess to receive the projecting end portions of the axle 16 the spars also passing through the forward and rear portions thereof. This wing portion 21 is also stream-lined, its upper and lower surfaces having substantially the same curvature but the outer end portions of the wings beyond the housing 20, may be given any desired cross-sectional contour to give the desired lifting action in flight.

As shown in the drawings (Figs. 3 and 10) the lower surface of each of these portions of the wings is formed with a double concave, the concave 22 of the greatest depth being located approximately at the center of pressure and the concave 23 of lesser depth being located just forwardly of the trailing edge of the plane. This construction of plane provides great lifting power with a minimum of head resistance and is especially adapted for scout machines where great speed is required.

To reduce head resistance of the wheels 15 when the machine is in flight with the chassis in retracted position, a hood 24 is provided for the rear edge of the lower portion of each wheel upon the lower side of each wing C, and this hood is stream lined rearwardly to provide stream lining for the wheels when the aeroplane is in flight. Obviously the housing 20 and hood 24 may be dispensed with in aeroplanes having very large wings, the wheels in such machines being housed within the wing between the upper and lower wing skins.

The chassis is held in extended position for alighting, by suitable rack bars 25 pivotally attached at $25^a$ to the axle and extending upwardly and rearwardly therefrom through suitable openings in the skin 26 of the fuselage, which skin is preferably spaced from the fuselage framing to provide a chamber or space between the frame and skin to receive these racks when they are projected upwardly therein upon retraction of the chassis. Each of the racks 25 is constructed as shown in Figs. 18, 19, 20 and 21, of a tube 27 preferably of stream lined contour in cross section with a longitudinal slot in its forward or flat side which slot is closed by a plate or strip 28 brazed or otherwise secured within the tube and provided with two longitudinal rows of holes 29 to be engaged by sprocket teeth 30 on the hub or projecting end of a transverse shaft 31 mounted in suitable bearing brackets 32 secured to the fuselage framing.

The strip 28 forms a longitudinal way within the tube 27 for a plate $32^a$ to which straps 33 embracing the hub of the sprocket 30 are firmly secured in any suitable manner, said plate $32^a$ having an opening intermediate its ends through which the inner side of the sprocket projects with its teeth in engagement with the holes 29 in the strip 28. This plate $32^a$ and strap 33 together form a yoke which is attached to the shaft 31 by embracing the hub of the sprocket and slides longitudinally within the rack tube 27, thus holding the rack in engagement with the sprocket at all times and forming an efficient guide for the rack bar in its up and down movement as the chassis is retracted or extended.

One of the bearings 32 has a casing 34 formed integral therewith for a worm 35 upon the lower end of an upwardly extending shaft 36, and secured upon the transverse shaft 31 is a second worm or worm gear 37 in mesh with the worm 35. The shaft 31 is preferably divided intermediate its ends so that the two parts may be inserted endwise through the bearings 32 and a coupling 38 connects the inner ends of the two parts of this shaft rigidly so that they turn as a solid shaft, the coupling being securely held engaged by a locking sleeve 39.

Any suitable motor may be provided for driving the shaft 36 and through the worm gears, rotating the shaft 31 to turn the sprockets 30 in engagement with the racks 25 and thus raise or lower the chassis, said chassis being locked in any position to which it is adjusted by means of the intermeshing of the worms 35 and 37 which at all times prevent longitudinal movement of the racks except when the worms are driven by the motor. The chassis may therefore function as a landing device in any position in which it happens to be when its wheels come in contact with the ground, and it is therefore not necessary that the chassis be fully extended before a landing can be made.

In Figs. 10 and 11 a suitable wind motor is shown for raising or lowering the chassis, this motor comprising a small wind wheel 38 mounted upon a suitable bracket 39 projecting laterally from the side of the fuselage through the skin thereof and firmly secured to the chassis frame. The shaft of the wheel 38 is provided with a bevel gear 40 in mesh with a like gear on a shaft 41 mounted on the bracket and extending into the fuselage. Free to rotate upon the shaft 41 (see Figs. 11 and 16) are bevel gears 42 arranged in opposed and spaced relation and in mesh with a similar gear 43 on the upper end of the shaft 36. The gears 42 are formed with clutch faces to be engaged by a clutch member 44 operatively connected to the shaft 41 to turn therewith, as by a spline, and free to slide longitudinally thereon into engagement with the clutch face of either gear. A T-shaped operating lever 45 is pivoted upon the bracket 39 with its long arm operatively connected with the clutch member 44 to shift the same upon the turning of the lever by means of rods 46 and 47 connected to the short arms of the T-lever. These rods extend to a point adjacent the pilot's seat in the machine and are provided with heads 48 with springs 49 interposed between the heads and a suitable support for the rods. These springs act equally upon the rods and normally hold the lever 45 in mid-position with the clutch member 44 out of engagement with the clutch faces of the gears 42. The wind wheel is thus normally free to turn without imparting motion to the shaft 36 for raising or lowering the chassis, but when the pilot presses upon one of the heads 48, the clutch 44 will be shifted into engagement with a clutch face of one of the gears 42 thus connecting the shaft 41 with the shaft 36 and motion will be imparted to the shaft 31 and sprockets 30 for turning them in the desired direction to raise or lower the rack bars and retract or extend the chassis.

Fig. 17 illustrates, diagrammatically, a covering for a pivot joint between an operating plane and its support, such as between the rudder plane G and the rear end of the fuselage or between the elevating plane I and fixed stability plane H, the pivot 50 being of any desired construction. In order to reduce wind resistance, the grooves or joint 51 where the rudder joins the fuselage, and which are usually left open, are covered by strips 52 of a suitable flexible material such as rubber, these strips forming a continuation of the skin of the rudder and fuselage to provide a continuous outer surface which at the same time will yield or bend to permit the free turning of the pivoted plane.

In Figs. 24 and 25 another form of wind operated power device is shown for raising and lowering the retractible chassis. This wind operated device comprises a plane or aerofoil 53 having, preferably, convex upper and lower surfaces of substantially the same curvature to present the same resistance for like positive and negative angles of incidence, and this aerofoil is pivotally mounted upon the axle 54 of the chassis frame 55 between the side members 56 of said frame, the axle being housed by said plane.

Tubular brace members 57 are pivotally attached at their lower ends to the axle and extend upwardly and rearwardly into the fuselage to hold the chassis in extended position. A suitable latch or dog 58 is provided for each member 57 to engage openings 59 and 60 therein and securely hold the chassis in its fully extended or fully retracted positions. The dogs are normally held in position to engage the openings, by means of springs 61, and an arm 62 on one of the dogs is provided with a push rod 63 by means of which the dogs may be turned out of engagement with the members 57 against the action of the spring 61, said dogs being connected to turn together, by a transverse rod 64 forming the pivots for the dogs.

To impart a varying incidence to the plane 53 as the chassis is raised thereby and thus present its greatest surface to the wind immediately upon the release of the chassis when it is in extended position, as shown in full lines in Fig. 24, and to thereafter vary this incidence as the chassis swings upward so that the plane will lie parallel with the chassis when it approaches the end of its upward movement and enters a suitable opening 65 provided therefor in the lower skin of the fuselage, rods 66 are pivotally attached at their lower ends to laterally extending arms 67 on the plane and extend upwardly through the hollow side members 56 of the chassis frame to near the point of pivotal attachment of these members to the fuselage. The upper end of each rod 66 is provided with a stud extending laterally through an opening in the side of the member 56 and on this stud is a roller 67 to engage cam grooves 68 and 69 in a cam plate 70 which is rigidly secured to the fuselage alongside the frame member 56. A guide 71 for the rod is provided in the member 56 to prevent lateral movement of the rod at its upper end and to permit free longitudinal movement. When the chassis is in lowermost position as shown in full lines in Fig. 24, the roller 67 is in the end portion of the slot 68 which end portion is eccentric to the pivot of the frame member 56 so that as the frame member swings upwardly, the roller is forced to move downwardly and outwardly in the end portion of the slot 68 and in so doing, moves the rod 66 endwise and through its connection with the plane 53 turns said plane on its axis to such a position that it will present the maximum of its surface to the air and will thus exert the greatest force to swing the chassis upwardly. After the plane has been turned to give it its maximum incidence, the roller 67 engages the substantially concentric portion of the slot 68 and thus the plane is held substantially on a radial line extending to the axis of the pivot of the frame as this frame swings upwardly, said plane passing through the opening 65 in the bottom of the chassis in a plane substantially parallel to the bottom of the chassis.

Upon release of the chassis so that it may again move downward to extended position, the roller 67 is caused to pass into the cam groove 69 by a spring gate 72 forming the dividing wall between the two cam slots, this wall or gate yielding as the roller passes up the slot 68 and allowing the roller to pass into the upper end of the slot 69. The cam slot 69 is arranged eccentric to the axis of the pivot of the frame so that as the frame swings downwardly, the roller 67 is gradually carried toward the pivot, thus moving the rods 66 longitudinally and swinging the plane to give it a negative incidence, in which position it is held during the downward swinging of the frame to present its upper surface to the force of the air currents which will force the frame to swing downwardly. When the chassis frame has reached the limit of its downward movement, the roller 67 lies in the lower end of the cam groove 69, and to prevent the roller from passing up this cam groove when the chassis frame is again swung upwardly, a latch or gate 73 is provided to fall across the groove 69 when the roller passes into its lower end, the gate being turned by means of a spring 74 which will yield to allow the roller to pass the gate in its movement down the groove 69.

The raising and lowering of the chassis is accomplished by simply releasing the dogs 58 which hold it at the extreme end of its up and down movements, thus permitting the force of air currents during the flight of the machine to act upon the operating plane or aerofoil to raise or lower the chassis according to the incidence given the plane by the automatic means comprising the cam plates 70 and rods 66.

The construction of the members 57 is preferably similar to that of the rack bars 25 previously described, each being provided with a rack to be enlarged by a sprocket wheel 75 secured upon the end of a transverse shaft 76 mounted in suitable bearings upon the fuselage frame. This shaft 76 is therefore rotated by the upward movement of the racks, and to assist in the final upward movement of the frame which carries the plane into the opening in the chassis, a fly wheel 77 is secured upon this shaft. When the chassis is in extended position and the dogs 58 are released, the wind resistance on the chassis will at once swing it rearwardly and upwardly, setting the fly wheel into rapid rotation so that the inertia of this wheel will perform the work of completing the upward movement of the chassis to house the same within the fuselage. When the chassis is in housed position, the release of the dog 58 permits gravity to initiate action of the fly wheel and give the aerofoil a negative incidence, when wind resistance on the aerofoil will swing the chassis downwardly and the inertia of the fly wheel will complete the final downward movement.

In order that the aeroplane may present as little head resistance as possible when in flight with the chassis in retracted position, it is desirable that the opening 65 in the fuselage be closed after the housing of the plane therein and to so close this opening, a sliding door 78 is provided which is preferably automatically moved forward beneath the plane when the chassis reaches the upper end of its movement. This door is also preferably automatically opened upon the beginning of the downward movement of the chassis and to accomplish this automatic opening and closing of the door, the shaft 76 is provided with two drums 79 loose upon the shaft and each connected to the shaft through the medium of a coiled spring 80 secured at one end to the drum and at its opposite end to a clutch member 81 adapted to be engaged by a corresponding clutch member operatively connected to the shaft to turn therewith but free to slide longitudinally thereon. Cables 82 are attached at one end to the rear portion of the door and passing under suitable guide pulleys 83, are wound upon the drums 79.

Coiled springs 84 are attached at their forward end to the door 78 near its forward edge and at their rear ends to suitable brackets on the fuselage frame. These springs exert a force to normally hold the door in open position, and the door is normally locked in open position when the chassis is in extended position, by means of dogs 85 carried by the fuselage and adapted to engage lugs 86 on the door, each latch being provided with a forwardly extending tail portion 87 adapted to be engaged by the operating plane 53 when said plane reaches the upper end of its movement into the fuselage. The engagement of the plane with the latch pieces 87 thus automatically operates the latches to release the door so that it may be closed as soon as the plane is fully within its housing in the fuselage. The upward swinging movement of the chassis frame imparts a rotary motion to the shaft 76 by reason of the engagement of the racks with the sprockets on said shaft, and therefore, the chassis being down and the door locked open by the latches 85, as shown in Fig. 24, the upward swinging of the chassis will turn the shaft 76 and put the springs 80 under tension, the drums 79 being held against turning by the cables 82 and the clutches 81 being engaged to be rotated by the shaft and wind up the springs thereon. The springs being thus wound, put the cables 82 under heavy tension so that immediately upon the release of the latches 85 by the operating plane, the door will be quickly slid forward, the cables 82 being wound upon the drums by the turning action of the springs 80. The tension of these springs 80 is sufficient to exert a pull upon the cables after the door is fully closed, and they thus hold it in closed position notwithstanding the pull of the springs 84 which are put under tension by the closing of the door. The springs 84 being under tension in order to open the door, it is only necessary to release the clutches 81, thus releasing the tension of the springs 80 which hold the drums 79, and allow the cables to unwind freely therefrom, the tension of the springs 84 acting to quickly open the door.

The retraction of the dogs 58 to permit the retraction of the chassis, is accomplished by the operation of the rod 63 by means of a handle 88 thereon, both dogs being operated at the same time through the medium of the connecting shaft 64. This releases the chassis so that the operating aerofoil may act automatically to raise it, and this aerofoil coming into contact with and operating the latches 85, automatically closes the door without any attention on the part of the operator. When it is desired to lower the chassis, it is necessary that the door be first opened and then the chassis released so that it may pass through the opening. To accomplish this, the clutches 81 are first operated to release the tension of the springs 80, these clutches being moved by means of pivoted levers 89 connected by a rod 90, and the pivot of one of these levers 89 is a vertical rod 91 having a crank arm 92 on its upper end to which a hand operated rod 93 is pivotally attached at one end and extends rearwardly to a point adjacent the pilot's station. On the rod 93 is a cam projection 94 which, after a longitudinal movement of the rod which is sufficient to turn the shaft 91 and levers 89 to release the clutches, will engage the upper end of the rod 63 and push down thereon sufficiently to turn the shaft 64 and release the dogs 58. The automatic opening of the door 78 and release of the chassis is therefore accomplished by a single movement of the rod 93. The providing of a chamber in the fuselage for a portion of or the entire retractable chassis and the providing of a suitable closure for this chamber with automatic means for opening and closing the closure is a very desirable feature in aeroplane construction as when the chassis is retracted with the opening in the fuselage closed, its bottom skin presents an unbroken continuous surface which offers the minimum of resistance to the passage of the aeroplane through the air.

What I claim is:—

1. In combination with an aeroplane, retractable alighting means and means operated by air currents while the aeroplane is in flight for retracting said alighting means.

2. In combination with an aeroplane, retractable alighting means, a motor, and means for transmitting motion from said motor to operate said alighting means, said motion transmitting means being adapted to hold said alighting means in any position to which it is adjusted.

3. In combination with an aeroplane, retractable alighting means, and means including a rack and pinion and worm gear means for raising and lowering said alighting means and holding the same against movement due to alighting stresses.

4. In combination with an aeroplane retractable alighting device, automatic means for operating said device, including worm gear means for holding the said device against movement due to alighting stresses.

5. In combination with an aeroplane, a wing having a convex lower surface, a retractable chassis frame, openings provided in said convex wing surface to house portions of said chassis frame, and means for closing said openings when said chassis frame is housed.

6. In combination with an aeroplane, a pivoted landing chassis, a pair of rack bars pivotally attached at one end to the chassis to operate the same and form bracing members to hold the chassis in extended position, a transverse shaft, pinions on the shaft in engagement with said racks, means for guiding and holding the racks in engagement with said pinions, a motor, and irreversible gearing for transmitting motion from the motor to the shaft.

7. In combination with an aeroplane, a pivoted landing chassis, a pair of rack bars pivotally attached at one end to the chassis to operate the same and form bracing members to hold the chassis in extended position, a transverse shaft, pinions on the shaft in engagement with said racks, means for guiding and holding the racks in engagement with said pinions, a motor operated by air currents during flight of the aeroplane, and means for transmitting motion from the motor to said shaft, including reversing and connecting and disconnecting means.

8. In an aeroplane, the combination of a fuselage and wings formed to provide a housing for a landing chassis, and a landing chassis adapted to be housed partially in said fuselage and partially in said wings.

9. In an aeroplane, the combination of a fuselage formed to receive portions of a retractable chassis, wings, housings on the wings for portions of said chassis, and a chassis to be housed in said fuselage and wing housings.

10. In an aeroplane, the combination of a fuselage and wings, a chassis frame connected to the fuselage at one end and provided with landing wheels at its opposite end, said frame having lateral projections upon which the wheels are mounted and said fuselage and wings being formed to house said frame and wheels when the chassis is retracted, and means for retracting the chassis.

11. In an aeroplane, the combination of a fuselage formed to receive portions of a retractable chassis, wings formed to receive other portions of a retractable chassis, a chassis frame pivotally connected at one end to the fuselage and having a transverse portion at its opposite end of greater length than the width of the fuselage, ground wheels upon the outer ends of said transverse portion, housings on the wings for the upper portions of the wheels, and means for retracting the chassis.

12. In an aeroplane, the combination of a fuselage formed to receive portions of a retractable chassis, wings formed to receive other portions of said chassis, a chassis frame pivotally attached at its upper end to the fuselage to swing toward and from the same, ground wheels on the chassis frame outside the vertical plane of the fuselage, housings on the wings for the upper portions of the wheels, downwardly extending portions on the wings forming stream line hoods for the rear sides of the lower portions of the wheels, and means for swinging the chassis frame on its pivotal connection with the fuselage.

13. In an aeroplane, the combination of a fuselage, a chassis frame pivotally attached at one end to the fuselage, rack bars pivotally attached to the lower portion of the frame and extending upwardly into the fuselage, said fuselage being formed with a space between the skin and framing thereof at each side for said rack bars and with an opening in its lower side to receive said frame, and means within the fuselage for engaging and operating the rack bars to swing the said chassis frame.

14. In an aeroplane, the combination of a fuselage, a chassis frame pivotally attached at one end to the fuselage, rack bars pivotally attached to the lower portion of the frame and extending upwardly into the fuselage, said fuselage being formed with a space between the skin and framing thereof at each side for said rack bars and with an opening in its lower side to receive said frame, a slidable closure for said opening, means within the fuselage for engaging and operating the rack bars, and means for operating the sliding closure to close the opening substantially flush with the outer surface of the fuselage.

15. In an aeroplane, the combination of a wing having an opening therein, a landing chassis retractable into said opening, and automatically operated means for closing said opening flush with the outer surface of the wing when the chassis is housed therein.

16. In an aeroplane, the combination of a wing having an opening therein, a landing chassis retractable into said opening, and means for closing said opening operated by the retraction of said chassis.

17. In an aeroplane, the combination of a wing having an opening therein, a landing chassis retractable into said opening, a closure for said opening, and means for automatically operating said closure.

18. In an aeroplane, the combination of a fuselage having an opening therein, a landing chassis retractable into said opening, a closure for said opening, means for automatically operating said closure, released by the retraction of said chassis to close the opening, and means for automatically opening the closure.

19. In an aeroplane, the combination of a fuselage having an opening therein, a landing chassis retractable into said opening, a closure for said opening, means for automatically closing the closure, means for automatically opening the closure, and manually operated releasing means for said automatic opening means.

20. In an aeroplane, the combination of a fuselage having an opening therein, a landing chassis retractable into said opening, a closure for said opening, means for automatically opening and closing said closure, releasing means for the automatic means operated by the operation of the chassis, and manually controlled releasing means for said automatic means.

21. In an aeroplane, the combination of a wing provided with wing spars having an opening between said spars, and a retractable chassis having portions adapted to be housed in said opening during flight and to close said opening.

22. In an aeroplane, the combination of a fuselage having an opening therein, a landing chassis retractable into said opening, a closure for said opening, and means put under tension by the operation of said chassis for automatically operating said closure.

23. In an aeroplane, the combination of a fuselage having an opening therein, a landing chassis retractable into said opening, a closure for said opening, automatic means made effective for operating the closure, by the operation of said chassis, and releasing means for said automatic closure operating means.

24. In an aeroplane, the combination of a fuselage having an opening therein, a landing chassis retractable into said opening, means for operating said chassis, a closure for said opening, and resilient means for operating said closure, put under tension by said retracting and extending means.

25. In an aeroplane, the combination of a fuselage having an opening therein, a landing chassis retractable into said opening, means for operating said chassis, a closure for said opening, a spring for opening said closure, and means operated by said chassis operating means, for closing the closure against the action of said spring.

26. In an aeroplane, the combination of a fuselage having an opening therein, a landing chassis retractable into said opening, means for operating said chassis, a closure for said opening, a spring for operating said closure in one direction, and means operated by the operation of said chassis for operating said closure in the other direction.

27. In an aeroplane, the combination of a fuselage having an opening therein, a landing chassis retractable into said opening, means for operating said chassis, a closure for said opening, a spring for operating said closure in one direction, a latch for holding the closure open and adapted to be released by a movement of said chassis, and resilient means put under tension by a movement of said chassis while the closure is held by said latch.

28. In an aeroplane, the combination of a fuselage having an opening therein, a landing chassis retractable into said opening, means for operating said chassis, a closure for said opening, springs for opening said closure, a rotatable member turned by the retraction of the chassis, resilient means put under tension by the rotation of said rotatable member and operatively connected to said closure to operate the same against the action of said springs, and means for releasing said resilient means to permit said springs to operate.

29. In an aeroplane, the combination of a fuselage having an opening therein, a landing chassis retractable into said opening, means for operating said chassis, a closure for said opening, springs for opening said closure, a latch to hold the closure in open position adapted to be released by the operation of the chassis, resilient means operatively connected to the closure and put under tension by the chassis operating means to close the closure against the action of said springs, and means for releasing said resilient means.

30. In an aeroplane, the combination of a fuselage having an opening therein, a chassis frame pivotally attached thereto to swing into the opening, rack bars pivotally attached to the chassis frame to move into the fuselage, means on the fuselage for engaging the rack bars to hold the same in adjusted position, a closure for the opening, means for automatically operating the closure, and means for successively releasing the automatic means and bars to first open the closure and then permit the lowering of the chassis.

31. In an aeroplane, a pivoted chassis frame adapted to swing toward and from the lower side of the aeroplane fuselage, a rack bar pivotally attached to the chassis frame for swinging the same, said rack bar comprising a tubular member having a longitudinal slot, and a rack plate secured within the tubular member across said slot.

32. In an aeroplane, the combination of a fuselage, a chassis frame pivotally attached at one end to the fuselage, a transverse shaft on the fuselage, pinions on the shaft, rack bars pivotally attached at one end to the chassis frame and each formed with a longitudinal guide way, strap members embracing the shaft adjacent the pinions and slidable within the guide way of the rack bars to hold the rack bars in engagement with the pinions and permit a longitudinal movement relative thereto, and means for turning the shaft to operate the rack bars and swing the chassis frame.

33. In an aeroplane, the combination of a fuselage frame, comprising longerons and struts between the longerons at their forward ends, said struts converging downwardly to a connection with the lower longerons, a chassis frame pivotally attached to the fuselage framing adjacent said convergent ends of said struts, and means for swinging the chassis frame upon its pivot.

34. In an aeroplane, a main sustaining wing, a retractable chassis, recesses provided in the said wing for housing portions of the chassis when retracted, automatic means of extending and retracting said chassis, and releasing means to permit said automatic means to become effective.

35. In an aeroplane, a main wing, a retractable chassis, recesses provided in said wing to house portions of said chassis when retracted and means to hold said chassis in its intermediate position against movement due to alighting stresses.

36. In an aeroplane, a supporting wing having slots adapted to house chassis frame members, a retractable chassis frame, and power means for altering the position of said frame.

37. In an aeroplane, a wing, a retractable chassis, recesses in the wing into which the chassis members are adapted to be retracted, and means for closing the recesses substantially flush with the external surface of the said wing.

38. In an aeroplane, a retractable chassis, power means for retracting said chassis, means for storing energy expended by said first means while said chassis is being retracted, and means for applying the said stored energy to the said chassis to move the same.

39. In an aeroplane, an alighting device adapted to be moved into a housing during flight, means for moving the said alighting device, means adapted to store energy exerted by said first named means, and means for applying said stored energy to cause a movement of said alighting device.

40. In combination with a retractable chassis for aircraft, means for housing the chassis when retracted, means for retaining the chassis in positions intermediate its extremes of movement, power means to operate the said chassis, and a clutch to connect the power means with the retracting means to move the said chassis.

41. In combination with an aeroplane wing, a retractable chassis, a housing on the wing to receive the said chassis, means for holding said chassis in positions intermediate its extremes of movement, power means for operating said chassis, engaging means between said power means and said chassis, and means including a spring for disengaging said engaging means.

42. In combination with an aeroplane, retractable alighting means, operating means therefor, and means for transmitting motion from said operating means to operate said alighting means, said motion transmitting means being adapted to hold said alighting means in any position to which it is adjusted.

In testimony whereof I affix my signature.

JAMES V. MARTIN.